United States Patent [19]

Compton et al.

[11] 3,893,258

[45] July 8, 1975

[54] METHOD FOR GROWING CELERY TRANSPLANTS

[75] Inventors: Peter J. Compton, Santa Maria; Sheldon W. Moline, San Jose; Robert E. McKenzie; Edward F. Christian, both of Salinas, all of Calif.

[73] Assignee: Union Carbide Corporation, New York, N.Y.

[22] Filed: Apr. 24, 1974

[21] Appl. No.: 463,530

[52] U.S. Cl. .......................... 47/58; 47/56; 47/57.6; 47/DIG. 9
[51] Int. Cl. ............................................. A01c 1/04
[58] Field of Search ............ 47/56, 57.6, 58, DIG. 9

[56] References Cited
UNITED STATES PATENTS
2,967,376  1/1961  Scott.................................. 47/57.6
3,683,583  8/1972  Cochran et al. .................... 47/56 X

*Primary Examiner*—Robert E. Bagwill
*Attorney, Agent, or Firm*—Owen, Wickersham & Erickson

[57] ABSTRACT

Better quality and more uniform celery transplants are obtained by (1) coating the celery seeds with a seed coating that fills only the recesses between the ribs but obtains a substantially smooth surface though the outer surface of the ribs remains substantially uncoated, (2) distributing the coated celery seeds at even intervals on a suitable seed tape, (3) planting the finished seed tapes in even spaced rows, preferably inside a greenhouse in loose textured soil, (4) growing the celery plants from the planted seed tapes, preferably under controlled light and moisture conditions and without any intermediate transplantations until the plants reach the full size suitable for transplantation in an open field, (5) pulling the grown celery transplants, and (6) preferably trimming the tap roots to a desired length.

10 Claims, 3 Drawing Figures

3,893,258

METHOD FOR GROWING CELERY TRANSPLANTS

BACKGROUND OF THE INVENTION

This invention relates to an improved method for growing celery transplants.

It may surprise some people to learn that celery is, in many instances, not grown in the open field directly from seed but that instead the open field plants are transplants which have been greenhouse grown. This is particularly true in major producing areas where several million dollars of celery transplants are sold each year and account for more than half of those areas' celery crops.

Heretofore, celery transplants have been produced by a cultivation technique which has been expensive, involving considerable labor and two transplantations. Typically, about 2500 seeds have been scattered in each 18 inches × 18 inches × 2½ inches flat. After thirty days, the small plants have been pulled, crudely sorted and then hand transplanted into identical flats, but at a rate of 110 plants per flat. After growing for another thirty days, these plants have been pulled, packed, and shipped bare-rooted to the final grower. Of total growing costs, including production overhead, estimated at about $7.00 per thousand transplants in 1973, about $4.50 has been for labor, most of this used for the transplantation step.

It is now believed that the extra transplanting step lowers the quality of the seedlings by disturbing the hair root systems and also by interferring with the development of the tap root. Yet, heretofore this technique has been more economical than not having the intermediate transplantation step, since it cuts in half the space requirements, as compared to growing the celery transplants in one step, and space has been important since the greenhouses have usually been high-cost glass houses and many of them have been located in relatively high-land-cost suburbs.

Objects of the present invention thus include a simpler and less expensive method of growing celery transplants, one which does not demand the excessive amount of labor presently required. With adoption of this new method it is believed that the percentage of celery grown from transplants will be even higher, because of relatively lower costs and a better product.

The present invention utilizes seed tape in achieving this end. In doing so, another problem arises. Celery seed is not a round, smooth seed, but an elongated seed with three or more ribs between which are recesses. The seed has a wrinkled appearance and is small in size, so that it is not easily handled. This has made it difficult to put the seed on seed tape.

The addition of coatings to seeds that are difficult to handle is well known, but heretofore seed coatings have been relatively thick, with a ratio of coating weight to seed weight of from 3:1 to 10:1; with seed tape, thick seed coatings interfere with efficient winding and use of seed tapes, making them difficult to handle and unconvenient to use. Therefore, the present invention is also directed to the problem of distributing the celery seed evenly on the seed tape, and in solving the problem a new type of coating process is used.

SUMMARY OF THE INVENTION

The present invention begins with the step of coating the celery seed with a very thin coating which is applied so that it substantially fills the recesses between the projecting ribs of the celery seed but, preferably, does not fully coat the ribs; in fact, the ribs are typically exposed. The purpose of applying this thin coating is essentially to provide a generally smooth outer overall surface; once this smooth outer surface has been achieved, no further coating need be added. This can be done, using known coatings, by having a higher ratio of seeds to coating in the coating process, as will be explained below. Moreover, the less coating there is, the less expensive the coating process becomes, and additional coating would have little advantage in promoting plant growth while having the previously noted disadvantages when used on seed tape.

The suitable coated celery seed is then applied to a seed tape of water-soluble material, such as that shown in U.S. Pat. No. 3,561,187. This is done in any suitable seed tape manufacturing machine, such as those shown by U.S. Pat. No. 3,772,849.

When the seed tape has been finished, it may be stored until ready for use or, of course, may be used immediately. The use of the seed tape enables the grower to plant the seed tapes in very evenly spaced rows at uniform planting distances and depths. The planting may be done inside the greenhouse, preferably in loose-textured soil. Alternately, it may, when suitable, be done outdoors. The celery is grown, preferably under controlled light and moisture conditions; and in any event, it is grown without any intermediate transplantations. When the plants reach the full size for transplantation in open field, they are pulled, but it appears that their roots are much less damaged than those of the twice-transplanted celery. The plants are much more uniform in size than prior-art-grown transplants. The tap roots may, if desired, be trimmed to a predetermined length. Trimmed or not, these celery transplants may then be shipped or otherwise transferred to the grower and placed in the field.

It is noteworthy that the present invention requires the use of seed tape and that in so doing, it results in better plants which are produced at less cost. These plants do occupy greenhouse (or other) space for about twice as long as the flat-grown plants and so capital investment per dollar of sales may be higher, but the overall reduction in cost appears to be approximately 30 percent. Also, in the good celery growing regions this can be kept up all year long, so there are good reasons for practicing this invention.

Other objects and advantages of the invention will become apparent from the following description of a preferred embodiment.

DESCRIPTION OF A PREFERRED EMBODIMENT

Figure 1:
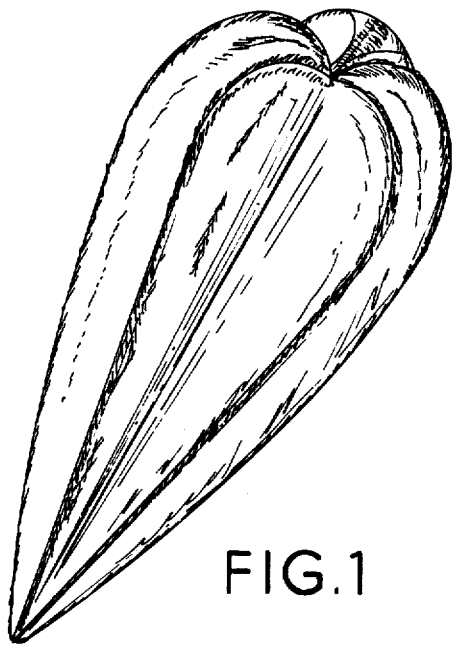
FIG. 1 is a greatly enlarged view in perspective of an uncoated celery seed.

Celery seed (FIG. 1) presents a sharply ridged, rough appearance. After being properly prepared by the seedsman to a desired moisture content, humidity, and so on, the seed is coated thinly; the coating method and material shown in the David B. Scott, Jr., patent, U.S.

Figure 2:
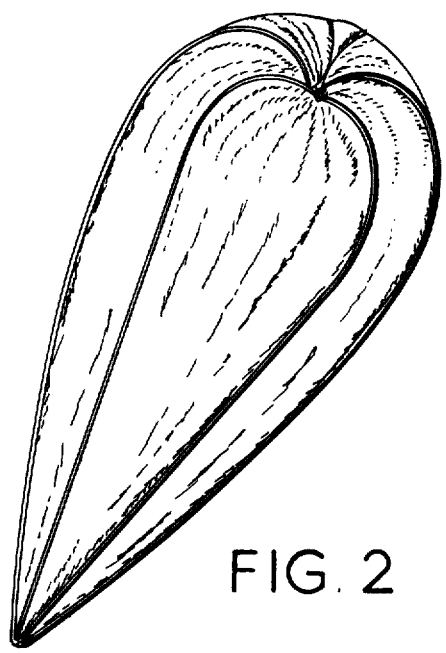
FIG. 2 is a similar view of the seed coated according to the principles of the invention.
Figure 3:
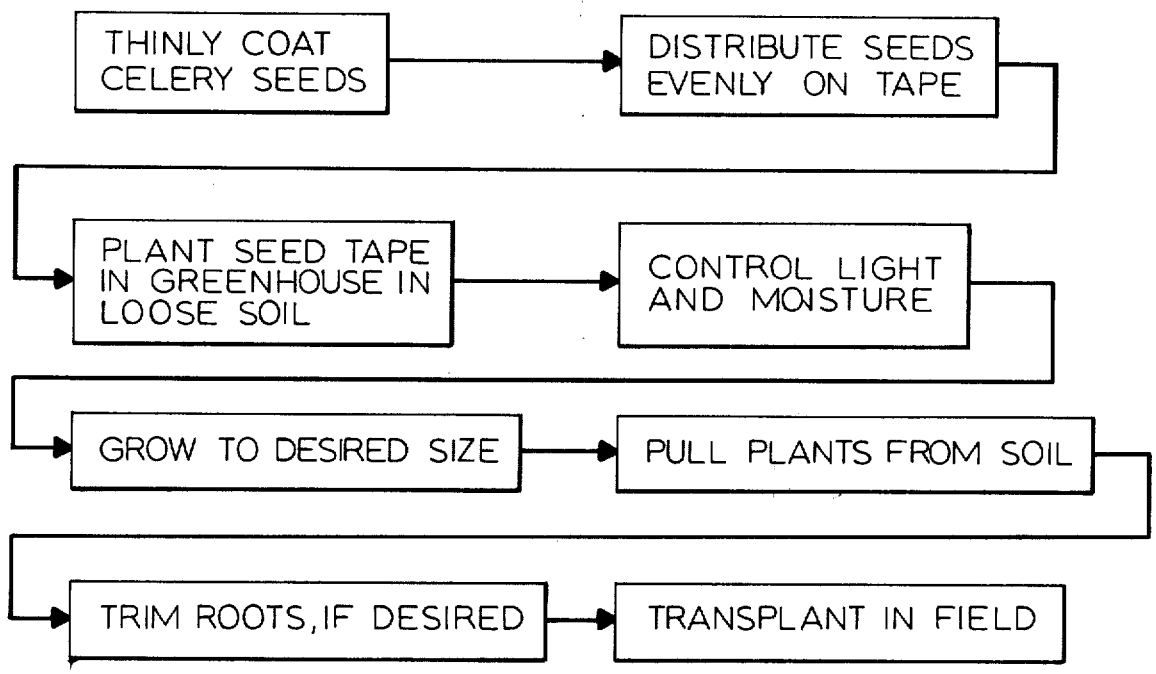
FIG. 3 is a flow sheet illustrating a specific preferred process of the invention.

Pat. No. 2,967,376, which issued Jan. 10, 1961, may be used. This patent fully describes a preferred type of seed coating which may be applied in a free-flowing state by mixture of the seeds in the free-flowing material. By a proper apportionment, which is usually readily determined, the celery seed may be thinly coated to appear as in FIG. 2, so that only the recesses between the ribs are filled and the ribs remain substantially exposed. The idea is to obtain a substantially smooth product without any excess of coating material, and this is readily done by proper apportionment such as 0.2 to 1.0 pound of coating per pound of seed.

A typical formula is:

| | |
|---|---|
| Celery seed | 1 pound |
| Dri-Flo starch ester derivative | ½ pound |
| Polyvinyl pyrrolidone solution | 30 ml |
| (100 grams per liter of 50—50 mixture of isopropyl alcohol and methylene chloride) | |

Dri-Flo is a hydrophobic starch ester derivative of ungelatinized granule cornstarch, the name being a trademark of National Starch Company.

The polyvinyl pyrrolidone solution is mixed with the seed to obtain a substantially uniform sticky coating and then the seed is tumbled with the starch ester derivative until a satisfactory coating is obtained. Then the excess powder is removed by sieving, with agitation. The increase in weight of the seed effected by the coating ranges from about 0.2 to 2.0 pounds per pound of seed, the preferred rate being about 0.3 to 0.5 pound of coating per pound of seed.

After the thin coating has been applied, the celery seeds are placed in the hopper of a seed-tape manufacturing machine, which places the seeds one at a time at exactly spaced intervals on a moving seed tape and then closes the tape. Preferably, the tape used is that shown in U.S. Pat. No. 3,561,187, which is a water-soluble tape giving excellent results. The spacing is important and is chosen according to the requirements of the grower. At the present time it is believed that the proper distance apart of the seeds on the tape should be ½ inch to 2 inches.

The prepared seed tape may be stored, preferably being kept cool and dry for many months, if desired, or it may be used at once. When the transplant grower is ready to use the seed tapes, he plants them in evenly spaced rows, e.g., ½ to 2 inches apart, preferably inside a greenhouse. Alternately, the planting may be outdoors, either in a cold frame or in the open. Loose-textured soil is not essential but is preferable. While the seed tapes may be planted in flats (e.g., at about 110–150 seeds per flat to produce about 110 plants per flat and corresponding to what is obtained in the prior art after one transplanting), it is often preferable to plant in open ground (whether inside a greenhouse or not) so that a scaled-down version of field cultured practices can be used. For example, mechanized planting, spraying, irrigation, and fertilization can then be used, with a small tractor. Field fumigation of soil and weed control can also be used. In any event, the soil is properly prepared beforehand, as preferred by the grower, and the seed tapes enable him to obtain a uniform planting depth, uniform distances apart of the rows, and uniform distances apart of the seeds in the rows. The seed tape disappears on the first watering, and the seeds then act like ordinary seeds except that they have been planted in a very uniform fashion. Therefore, they can be planted somewhat closer than prior-art transplants could while also providing uniform results. The uniform depth of planting means that the plants emerge on approximately the same day, and the stalks are relatively uniform in size. This is important to the seed transplant grower as giving a better product for him to sell.

The plants are preferably, but not necessarily, grown under controlled light, moisture, and temperature conditions, according to the location and season of the year. The use of proper greenhouse or cold frame material such as proper glass or plastic film or fiberglass panels may minimize the amount of heat required, and the conditions are, in any event, kept at what the transplant grower believes to be the desired conditions that are feasible and economical. Celery plants are not so demanding that the temperature needs to be precisely regulated at every stage, so long as it is kept in a range of 55°F. to 75°F. All these conditions of growing are the same as in the present celery transplant industry.

The plants are preferably grown for approximately sixty days or somewhat less; since the transplant shock is avoided, less total time is usually taken up by growing the plants without the intermediate transplant than with it. Before pulling, the plants are preferably hardened according to standard procedure, as by withholding water for a few days. Since the soil is loose, the plants can be easily pulled from the soil, and they are immediately distinguishable from prior-art flat-grown plants because of the presence of long well-developed tap roots, typically 6 inches to 8 inches long before trimming. The hair roots are also better developed. The hair or feeder roots on the tape-grown plants are less entangled than those from one plant to another and thereby subject to easier handling with less damage when they are planted in the field. If desired, the tap roots may be trimmed, though they may be left intact if the ultimate grower believes that to be important. At any rate, they are field-planted in the usual manner, except that being more uniform and more separate, the grower himself finds it easier and quicker to plant and therefore is more pleased with the product. In addition, he gets a better quality of plant, on the average, while also getting a more uniform plant, so that in the fields the plants are more uniform and thereby enable a more uniform harvesting.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method of growing celery transplants, comprising
    coating celery seeds with a seed coating filling the recesses between ribs with the outer surface of the ribs remaining substantially uncoated to obtain a substantially smooth surface,
    distributing said coated celery seeds at even intervals on a seed tape of water-soluble material,
    planting finished said seed tapes in even spaced rows,
    growing celery plants therefrom without any intermediate transplantation until they reach full size for transplantation in a final growing field, and pulling the grown celery transplants which have long well-developed tap roots and hair roots.

2. The method of claim 1 wherein said planting and growing steps are done in a greenhouse under controlled light and moisture conditions.

3. The method of claim 1 wherein said coating step adds a polyvinyl pyrrolidone sticker in solution form to the seeds and then tumbles them with starch ester derivative.

4. A method of growing celery transplants, comprising
coating celery seeds with a seed coating filling only the recesses between ribs to obtain a substantially smooth surface with the outer surface of the ribs remaining substantially uncoated,
distributing said coated celery seeds at even intervals on a seed tape of water-soluble material,
planting finished said seed tapes in even spaced rows inside a greenhouse in loose-textured soil,
growing celery plants therefrom in said greenhouse under controlled light and moisture conditions, without any intermediate transplantation until they reach full size for transplantation in an open field,
pulling the grown celery transplants which have long well-developed tap roots and hair roots, and
trimming the tap roots to a desired length.

5. In a method for providing celery seed to a machine for making celery seed tape with evenly distributed seeds, said machine having means for selecting one smooth-walled seed at a time and distributing said seeds evenly along said tape, the improvement comprising
coating said seeds to fill substantially the recesses between the projecting ribs of the celery seeds with the outer surface of the ribs remaining substantially uncoated, so as to provide a smooth outer surface.

6. In a method for providing celery seed to a machine for making celery seed tape with evenly distributed seeds, said machine having means for selecting one smooth-walled seed at a time and distributing said seeds evenly along said tape, the improvement comprising
thinly coating said seeds to fill substantially the recesses between the projecting ribs of the celery seeds but without fully coating said ribs, so as to provide a smooth outer surface.

7. The method of claim 6 wherein said coating step adds a polyvinyl pyrrolidone sticker in solution form to the seeds and then tumbles them with starch ester derivative.

8. A coated seed wherein a seed has an irregular surface and wherein the coating fills the irregularities to provide a smooth surface consisting of the coating exterior and uncoated seed portions.

9. Celery seed having ribs with recesses between ribs, coated so that substantially all the recesses between the ribs are filled while the ribs themselves remain at least partly uncoated, so as to provide a smooth seed suitable for mechanized seed taping.

10. A method for seed taping when the seed after cleaning is too irregular in surface to be suitable for seed taping, comprising, thinly coating such seed to fill irregularities up to about the level of projecting portions, without fully coating them, to provide a smooth outer surface without additional coating therebeyond, and evenly distributing said seed on a tape.

* * * * *